United States Patent
Guillou et al.

(10) Patent No.: US 9,714,764 B2
(45) Date of Patent: Jul. 25, 2017

(54) CHEMICAL-LOOPING COMBUSTION METHOD WITH DILUTE PHASE REMOVAL OF ASHES AND FINES IN THE OXIDATIONZONE AND PLANT USING SAME

(71) Applicants: TOTAL SA, Courbevoie (FR); IFP Energies nouvelles, Rueil-Malmaison (FR)

(72) Inventors: Florent Guillou, Ternay (FR); Thierry Gauthier, Brignais (FR); Ali Hoteit, Puteaux (FR); Sebastien Rifflart, Paris (FR)

(73) Assignees: TOTAL SA, Courbevoie (FR); IFP ENERGIES NOUVELLES, Rueil-Malmaison (FR)

( * ) Notice: Subject to any disclaimer, the term of this patent is extended or adjusted under 35 U.S.C. 154(b) by 503 days.

(21) Appl. No.: 14/361,755

(22) PCT Filed: Oct. 25, 2012

(86) PCT No.: PCT/FR2012/000432
§ 371 (c)(1),
(2) Date: May 30, 2014

(87) PCT Pub. No.: WO2013/079817
PCT Pub. Date: Jun. 6, 2013

(65) Prior Publication Data
US 2014/0335461 A1    Nov. 13, 2014

(30) Foreign Application Priority Data
Dec. 2, 2011 (FR) .................... 11 03698

(51) Int. Cl.
*F23C 10/01* (2006.01)
*F23C 10/00* (2006.01)
(Continued)

(52) U.S. Cl.
CPC ............ *F23C 10/01* (2013.01); *F23C 10/005* (2013.01); *F23C 10/08* (2013.01); *F23C 10/24* (2013.01);
(Continued)

(58) Field of Classification Search
CPC ....................................... F23C 10/01
(Continued)

(56) References Cited

U.S. PATENT DOCUMENTS 2,394,710 A    2/1946   McAfee
3,700,422 A *  10/1972  Johnson et al. ........ C01B 3/061
                                                       48/197 R
(Continued)

FOREIGN PATENT DOCUMENTS

CN    201521948 U    7/2010
CN    102200277 A    9/2011
(Continued)

OTHER PUBLICATIONS

Office Action of SIPO of Chinese Appln. No. 201280059113.8 dated Nov. 13, 2015 with English translation.
(Continued)

*Primary Examiner* — Avinash Savani
(74) *Attorney, Agent, or Firm* — Fitch, Even, Tabin & Flannery, LLP (57) ABSTRACT

The invention relates to a method for chemical-looping combustion of a hydrocarbon-containing feedstock, comprising:
contacting oxygen-carrying material particles coming from a reduction zone R0 with an oxidizing gas stream in a reactive oxidation zone R1,
separating the fly ashes, the fines and the oxygen-carrying material particles within a mixture coming from zone R1 in a dilute phase separation zone S2, the driving
(Continued)

force required for dilute phase elutriation in S2 being provided by the oxidizing gas stream from reactive oxidation zone R1.

Optionally, partitioning is carried out in a dedusting zone S4, then possibly in a dense phase elutriation separation zone S5.

The invention also relates to a chemical-looping combustion plant allowing said method to be implemented.

15 Claims, 2 Drawing Sheets

(51) Int. Cl.
  *F23C 10/26* (2006.01)
  *F23C 10/08* (2006.01)
  *F23C 10/24* (2006.01)

(52) U.S. Cl.
  CPC .... *F23C 10/26* (2013.01); *F23C 2900/10003* (2013.01); *F23C 2900/99008* (2013.01); *Y02E 20/346* (2013.01)

(58) Field of Classification Search
  USPC .................................................. 431/170, 171
  See application file for complete search history.

(56) References Cited

U.S. PATENT DOCUMENTS

| | | | |
|---|---|---|---|
| 3,729,551 A | 4/1973 | Gorin | |
| 4,000,991 A * | 1/1977 | Melin, Jr | B01D 47/00 210/696 |
| 9,494,315 B2 | 11/2016 | Guillou et al. | |
| 2007/0124997 A1 | 6/2007 | Liu | |
| 2008/0164443 A1 | 7/2008 | White | |
| 2008/0193349 A1 | 8/2008 | Morin | |
| 2009/0072538 A1 | 3/2009 | Morin | |
| 2009/0123346 A1 | 5/2009 | Morin | |
| 2011/0094226 A1 * | 4/2011 | McHugh | F01K 23/064 60/645 |
| 2011/0120560 A1 | 5/2011 | Proll | |
| 2011/0300060 A1 | 12/2011 | Guillou | |
| 2011/0303875 A1 | 12/2011 | Hoteit | |
| 2012/0134904 A1 | 5/2012 | Sanchez-Molinero | |
| 2012/0167808 A1 | 7/2012 | Beal | |

FOREIGN PATENT DOCUMENTS

| | | |
|---|---|---|
| EP | 0211483 A2 | 2/1987 |
| EP | 2273192 | 1/2011 |
| FR | 2556983 | 6/1985 |
| FR | 2563118 A1 | 10/1985 |
| FR | 2850156 | 7/2004 |
| FR | 2883773 A1 | 10/2006 |
| FR | 2956331 A1 | 8/2011 |
| JP | 64-79504 | 3/1989 |
| WO | 2010034900 A2 | 4/2010 |
| WO | 2010/052415 | 5/2010 |
| WO | 2011/007055 A2 | 1/2011 |

OTHER PUBLICATIONS

Richard K. Lyon et al. Pollution Free Combustion of Coal and Other Fossil Fuels, XP008023928, Western States Section/The Combustion Institute 1998 Fall Meeting, Oct. 26 and 27, 1998.

* cited by examiner

CHEMICAL-LOOPING COMBUSTION METHOD WITH DILUTE PHASE REMOVAL OF ASHES AND FINES IN THE OXIDATIONZONE AND PLANT USING SAME

FIELD OF THE INVENTION

The invention relates to the sphere of chemical-looping redox combustion of solid hydrocarbon-containing feedstocks in order to produce energy, syngas and/or hydrogen.

More particularly, the invention relates to the removal of ashes and fines produced in the chemical-looping combustion plant.

Terminology

Chemical-Looping Combustion or CLC: In the text hereafter, what is referred to as a CLC (Chemical-Looping Combustion) is a loop oxidation-reduction (redox) process on active mass. It can be noted that, in general, the terms oxidation and reduction are used with regard to the oxidized or reduced state of the active mass respectively. In a chemical-looping combustion plant, the oxidation zone is where the redox mass is oxidized and the reduction zone is where the redox mass is reduced.

Devolatilization

During thermal treatment, the organic compounds lose volatiles, first water and carbon dioxide, liquid and then gaseous hydrocarbons, then carbon oxide and eventually hydrogen. This process is called devolatilization. The devolatilization temperature and the magnitude of the phenomenon depend on the initial organic compound. Thus, for coals of increasing rank, devolatilization occurs at increasingly high temperatures.

Fluidized Bed

In the rest of the description:
what is referred to as a dense fluidized bed is a fluidized bed wherein the gas fraction $\epsilon_g$ is below 0.9, preferably below 0.8,
what is referred to as a dilute fluidized bed is a fluidized bed wherein the volume fraction of metallic oxide particles is below 10 vol. %.

Riser

In the rest of the description, what is referred to as a riser is a vertical enclosure of tubular shape wherein the fluids are subjected to an ascending motion.

BACKGROUND OF THE INVENTION

The Ashes Issue

Chemical-looping combustion is performed using oxygen-carrying materials such as metallic oxides that yield their oxygen in a reduction zone (referred to as "fuel reactor") under suitable operating conditions. Once reduced, the material is carried to an oxidation zone (referred to as "air reactor") where it is reoxidized on contact with an oxidizing gas (such as air or water vapour for example).

More generally, a chemical-looping combustion process comprises one or more reaction zones making up a reduction zone, wherein combustion of a fuel (a hydrocarbon-containing feedstock for example) is carried out by contact with an oxygen-carrying solid that is reoxidized afterwards in at least one oxidation zone by contact with air or water vapour prior to being sent back to the combustion (or reduction) zone (s). The reaction zones allowing chemical-looping combustion reactions to be conducted generally consist of fluidized beds or transported beds.

Chemical-looping combustion (CLC) of solid hydrocarbon feedstocks is a method allowing notably energy (vapour, electricity, etc.) to be produced by recovery of the heat released by the combustion reactions, while producing $CO_2$-rich fumes. It is therefore possible to consider $CO_2$ capture after condensation and compression of the fumes. It is also possible to consider the production of syngas, or even hydrogen, by controlling the combustion and by implementing the required purifications downstream from the combustion process.

In the reaction mechanisms associated with chemical-looping combustion in the reduction zone, it is established that the solid fuel goes through a gasification stage, promoted by the presence of water vapour or of carbon dioxide and by the temperature, then that the gas produced by the gasification stage is oxidized on contact with the oxygen-carrying material. If the solid fuel contains volatiles, the latter devolatilize at least partly on contact with the hot oxygen-carrying material and they are then oxidized thereby. It is also possible, in cases where the oxygen-carrying material naturally releases the oxygen according to the operating conditions, to have direct oxidation of the solid fuel by the gaseous oxygen released by the material in the fuel reactor.

Chemical-looping combustion of solid feedstocks requires severe and compelling operating conditions to be able to conduct the combustion reactions. In order to favour gasification of the fuel, high temperatures generally ranging between 800° C. and 1100° C., preferably between 850° C. and 1000° C., are necessary. The time required for gasification decreases as a function of the temperature and it generally ranges between 30 seconds and 30 minutes. It can therefore be advantageous to perform partial gasification, to separate the non-gasified fuel residue from the effluents and to recycle it. It is thus possible to reach rates of conversion (through gasification) per pass ranging between 50% and 80% in a temperature range between 850° C. and 1000° C., with reaction times ranging between 1 minute and 10 minutes, typically between 3 minutes and 5 minutes. The gasification times can be reduced by increasing the partial oxidizing gas ($H_2O$, $CO_2$) pressure.

Another problem linked with chemical-looping combustion of solid feedstocks relates to the formation of ashes. Indeed, solid fuels have not insignificant mineral material contents and, once combustion of the carbon and of the hydrogen is completed, solid residues called ashes form. Table 1 groups the analyses of two coals A and B by way of example. It can be observed that the ash content of the coals varies according to the origin of the solid feedstock, but this content is not insignificant. It typically represents 5 to 20% of the mass of dry coal. Some solid fuels such as pet coke have much lower ash contents. There are also solid fuels with higher ash contents.

These ashes essentially consist of silicon and aluminium oxide, but they also contain other components, as illustrated by way of example in Table 1.

TABLE 1

Analysis of the various coals

| | | | Coal A | Coal B |
|---|---|---|---|---|
| Dry coal analysis | Ashes | wt. % | 10.3 | 14.8 |
| | Volatile matter | wt. % | 37.6 | 24 |
| | Sulfur | wt. % | 0.5 | 0.57 |
| | Specific heat | Kcal/kg | 6710 | 6630 |

TABLE 1-continued

Analysis of the various coals

| | | | Coal A | Coal B |
|---|---|---|---|---|
| Ultimate analysis | C | wt. % | 71.1 | 73.46 |
| | H | wt. % | 4.77 | 3.87 |
| | N | wt. % | 1.41 | 1.65 |
| | S | wt. % | 0.5 | 0.57 |
| | Ashes | wt. % | 10.3 | 14.76 |
| | O (by difference) | wt. % | 11.92 | 5.69 |
| Ashes composition | SiO2 | wt. % | 67 | 49.84 |
| | Al2O3 | wt. % | 19.2 | 40.78 |
| | Fe2O3 | wt. % | 5.2 | 2.9 |
| | CaO | wt. % | 2 | 1.08 |
| | MgO | wt. % | 1.2 | 0.26 |
| | TiO2 | wt. % | 0.9 | 1.96 |
| | K2O | wt. % | 1.7 | 0.64 |
| | Na2O | wt. % | 1.7 | 0.06 |
| | SO3 | wt. % | 0.9 | 0.52 |
| | P2O5 | wt. % | 0.2 | 1.05 |

The ashes resulting from the combustion of the coal are made up of residual fine particles. Their melting point varies according to their composition and it generally ranges between 1000° C. and 1500° C. However, at lower temperatures, for example between 800° C. and 1000° C., it is possible to observe a phenomenon of agglomeration of the ash particles that become sticky. They can therefore either agglomerate with one another, or they agglomerate with the particles of oxygen-carrying material. Considering the operating conditions in the chemical-looping combustion process, two types of ashes can be distinguished:

fly ashes: they correspond to the ashes that are carried into the fuel reactor by the combustion gases, agglomerated ashes: they correspond to the ashes that agglomerate with one another or with the oxygen-carrying material and that are too heavy to be carried into the fuel reactor by the combustion gases.

Fly ashes generally represent 50% to 99% of the ashes formed, typically 70% to 90%. Their grain size is relatively fine with generally at least 25% fines with sizes below 10 microns and 90% fines with sizes below 100 microns. The Sauter mean diameter representative of the fly ash grain size generally ranges between 5 and 30 microns, and it is typically close to 10 microns. The grain density of these ashes generally ranges between 2000 and 3000 kg/m$^3$, and it is generally close to 2500 kg/m$^3$.

The grain size of the agglomerated ashes is more delicate to estimate and depends on the conditions of implementation of the method. In general terms, the grain size of these ashes is estimated to be above 100 microns and their size can reach several millimeters.

Patent application FR-2,850,156 describes a chemical-looping combustion method wherein the solid fuel is crushed prior to being fed to the circulating fluidized-bed reduction reactor so as to allow more complete and faster combustion. The method produces nearly 100% fly ashes that are separated from the circulating oxides. Separation downstream from the circulating bed is first provided by a cyclone, then by a device comprising a bed fluidized by water vapour allowing separation of the unburnt particles from the metallic oxide particles. Entrainment of unburnt particles in the oxidation zone and therefore $CO_2$ emissions in the oxidation reactor effluents is thus avoided. The fly ashes are separated from the oxide particles in a second circuit comprising a fluidized bed separator.

N. Berguerand's thesis "Design and Operation of a 10 kWth Chemical-Looping Combustor for Solid Fuels", ISBN 978-91-7385-329-3, describes a device allowing coal combustion to be conducted using a chemical loop.

This device consists of an oxidation reactor using metallic particles, a cyclone allowing separation of the particles and of the depleted air after oxidation, a fluidized bed supplied with oxidized metallic oxides through the return leg arranged below the cyclone, wherein reduction of the metallic oxide is carried out by combustion of the coal. The coal is fed into the upper part of the dilute phase fluidized bed. In the reduction reactor, combustion of the coal takes place progressively: the coal particles first descend and devolatilize in the dilute phase, countercurrent to the fluidization gases, wherein the metallic oxides are present in small amounts only; then they come into contact with the fluidized metallic oxides in dense phase. The long residence time allows to gasify the coal and to produce combustion gases containing large amounts of carbon monoxide and of hydrogen that pass into the dilute phase.

According to this document, the reduction reactor is equipped with a particle separator integrated in the dense phase, which requires additional gas for the separation. In this system, no specific device allowing separation and discharge of the ashes formed during combustion of the solid feedstocks is provided.

In order to overcome the drawbacks of the two systems described above, the applicants have developed a chemical-looping combustion method allowing, even from coarse fuel particles, to obtain total combustion of the solid feedstock while minimizing the amount of solid feedstock to be recycled, which allows to maximize the energy efficiency of the method. The combustion method according to the invention allows to capture at least 90% of the $CO_2$ emitted by the combustion in the fumes directly at the combustion reactor outlet, the capture rate being defined by the ratio of the amount of $CO_2$ emitted in the fumes coming from the combustion reactor to the amount of $CO_2$ emitted in the chemical-looping combustion process.

At the combustion process outlet, the $CO/CO_2$ molar ratio of the fumes downstream from the cyclones is below 0.05 and the $H_2/H_2O$ ratio is below 0.05. This is achieved, on the one hand, through optimization of the initial contact between the oxygen-carrying particles and the solid fuel so as to promote the coal gasification reactions and, on the other hand, through optimization of the contact between the gasification products and the metallic oxides so as to produce effluents that have undergone total combustion ($H_2$, CO and HC<1 vol. % in the fumes).

Besides, separation of the unburnt fuel particles from the metallic oxide particles is carried out upstream from the reduction reactor fumes deducting stage so as to best use the maximum kinetic energy of the fumes for separation of the two types of particles.

The chemical-looping method comprises at least:
contacting of the solid feedstock particles in the presence of metallic oxide particles in a first reaction zone operating under dense fluidized bed conditions,
combustion of the gaseous effluents from the first reaction zone in the presence of metallic oxide particles in a second reaction zone,
separation, within a mixture from the second reaction zone, of the gas, the unburnt particles and the metallic oxide particles in a separation zone,
reoxidation of the metallic oxide particles in an oxidation zone prior to sending them back to the first reaction zone.

Downstream from the unburnt and metallic oxide particles separation zone, a dedusting system comprising for example one or more cyclone stages can be provided for separation of the particles carried along in the fumes of the combustion zone of the fuel reactor. The fly ashes are carried along in the fumes to this dedusting system with the unburnt solid fuel particles. In order to maximize the energy efficiency of the plant, it is necessary to recover the main part of the unburnt fuel particles and thus to carry out deep dedusting. This dedusting will then allow to recover the unburnt particles, as well as a large part of the fly ashes that are then recycled to the fuel reactor.

In order to remove the ashes, it is possible to position an enclosure comprising a fluidized bed on the line channelling the particles separated during the dedusting stage so as to eliminate the fly ashes through elutriation. However, this means does not allow to control elutriation of the ashes and elutriation of the unburnt particles separately. In fact, in this case, good elimination of the ashes produced is consecutively translated into a significant elimination of the unburnt particles and therefore a decrease in the energy efficiency or a decrease in the $CO_2$ capture rate.

Furthermore, in cases where particles of the oxygen-carrying material are carried to the dedusting zone, it is necessary to dimension a large-size fluidized bed so as to allow sufficient time for elutriation separation in the fluidized bed.

In order to remove the ashes produced in the reduction zone without eliminating too many unburnt feedstock particles, the applicant has developed an improvement in this method using a particular reduction zone configuration, with: a first reaction zone operating under dense fluidized bed conditions; a second reaction zone; a fast separation zone for separation of the unburnt solid feedstock particles, the fly ashes and the oxygen-carrying material particles within a mixture coming from the second reaction zone; dedusting of the fumes; a particle stream division zone, part of the particles being directly recycled to the first reaction zone, the other part being sent to an elutriation separation zone so as to recover the ashes and recycle the dense particles to the first reaction zone.

However, ashes can also be carried to the oxidation zone. Indeed, during combustion in the reduction zone, the feedstock degradation produces two types of ashes: either agglomerated bottom ashes that are not transported pneumatically with the entrained metallic oxides bed, or fly ashes that are carried along with the solid bed. Whereas the former ones are readily removed at the fluidized-bed reactor bottom by simple gravity flow, the latter flow together with the oxides and, in the absence of a device controlling their population in the bed, they accumulate therein. The ashes are thus carried from the reduction zone to the oxidation zone, all the more so since no ash population control device is arranged in the reduction zone.

The accumulation of ashes has many consequences and it generates two major drawbacks:
solid flow disturbance through modification of the average grain size of the bed likely to cause control problems as regards the circulation of this solid bed,
dilution of the oxygen-carrying function of the metallic oxides, leading to a decrease in performance of the method.

Alternatively or complementarily to the removal of ashes and fines in the reduction zone, a new configuration is provided for the oxidation zone (or air reactor), which allows to exploit the driving force of the air (oxidizing gas) used for reoxidation of the solid to achieve separation between the oxygen-carrying particles (metallic oxide) and the particles to be removed: ashes and metallic oxide fines.

DESCRIPTION OF THE INVENTION

A new oxidation zone (air reactor) configuration comprising the following elements is thus provided:
separation of the particles within a mixture coming from the dilute phase reactive oxidation zone, allowing to recover with the fumes the major part of the ashes,
optional dedusting of the fumes coming from the separation zone,
in a variant, integration of a reactor vessel in form of a dense fluidized-bed enclosure for controlling the oxygen-carrying material recycle around the air reactor and the ash population by dense-bed elutriation.

The aforementioned bottom ash issue mainly concerns the reduction zone (fuel reactor). However, if bottom ashes, agglomerated and heavier than fly ashes, were present, they would be optionally and simply discharged by gravity flow in the bottom of the air reactor and extracted, for example by means of a cooled endless screw.

The operation of the method described is favoured by the use of an oxygen-carrying material having a grain size composition and a grain density promoting separation with the fly ash, the unburnt fuel and the agglomerated ash particles. The grain size composition of the oxygen carrier is therefore preferably such that 90 wt. % of the particles have a grain size ranging between 100 and 500 microns, preferably 90% between 150 and 300 microns, and more preferably 95% ranging between 150 and 300 microns.

Furthermore, the grain density of the oxygen-carrying particles is preferably above 2500 $kg/m^3$, more preferably above 3400 $kg/m^3$ and most preferably above 4000 $kg/m^3$.

Through the effect of chemical or mechanical aging, the grain size distribution of the oxygen-carrying material evolves over time and fines of mean diameter predominantly ranging between 50 and 150 μm form. For proper operation of the plant, it is desirable to keep a grain size on average above 150 μm. The fines produced by attrition of the oxygen-carrying material are thus removed simultaneously with the ashes according to the method described in the present invention.

SUMMARY OF THE INVENTION

The invention relates to a method for chemical-looping combustion of a hydrocarbon feedstock of solid particles, wherein an oxygen-carrying material circulates in form of particles, comprising:
contacting hydrocarbon feedstock particles with the oxygen-carrying material particles in a reduction zone R0,
contacting oxygen-carrying material particles from reduction zone R0 with an oxidizing gas stream in a reactive oxidation zone R1,
separating the fly ashes, the fines and the oxygen-carrying material particles within a mixture from zone R1 by dilute phase elutriation in a dilute phase separation zone S2 so as to discharge through a discharge line a gaseous effluent (7) comprising the major part of the fly ashes and of the oxygen-carrying material fines, and to send a particle stream (8) comprising the major part of the oxygen-carrying particles to reduction zone R0, the driving force required for dilute phase elutriation in S2 being provided by the oxidizing gas stream coming from reactive oxidation zone R1.

Preferably, the oxygen-carrying particles are circulated in a loop in oxidation zone R1 by means of a line allowing to recycle a stream (10) of oxygen-carrying particles sedimented in the dense fluidized phase, from the bottom of separation zone S2 to the lower part of oxidation zone R1.

Preferably, heat is recovered in the dense fluidized phase formed in the bottom of separation zone S2 by means of a heat exchanger E3.

Advantageously, an additional oxidizing gas stream (6) is fed to the top of reactive zone R1 so as to maintain a gas velocity ranging between 30 and 300% of the mean terminal settling velocity of the oxygen-carrying material fines of diameter ranging between 50 and 150 μm.

In one embodiment, deep separation of the ashes, the fines and the oxygen-carrying particles is performed in a dedusting zone S4 in order to discharge a gas stream (11) containing the major part of the ashes and the fines, as well as a particle stream (12) containing the major part of the oxygen-carrying material that is sent through a delivery line to reduction zone R0.

Preferably, dense phase elutriation separation is then carried out in a dense phase elutriation separation zone S5 arranged downstream from dedusting zone S4 and fluidized by a non-reducing gas (13) allowing to separate the fly ashes from the oxygen-carrying material in particle stream (12) in order to send a particle stream (14) rich in oxygen-carrying particles to reduction zone R0 and to discharge a gas stream rich in fly ashes (15).

Advantageously, a particle stream comprising part of the solid particles separated in dense phase elutriation separation zone S5 is recycled to oxidation zone R1.

Preferably, heat is recovered in the dense fluidized phase of separation zone S5 by means of a heat exchanger E6.

The invention also relates to a plant for carrying out chemical-looping redox combustion of a solid hydrocarbon feedstock according to the method described above, said plant comprising at least:
a reduction zone R0,
an oxidation zone comprising a reactive zone R1 provided with feed means supplying oxygen-carrying particles (1) coming from reduction zone R0 and feed means supplying oxidizing fluidization gas (2), and a dilute phase elutriation separation zone S2 arranged above reactive zone R1, of significantly larger diameter than reactive zone R1 so as to slow down the mixed phase coming from R1 and provided with feed means allowing to feed a mixed phase (5) comprising gas and particles coming from first reaction zone R1.
a discharge line for discharging a transported phase (7) rich in ashes and fines,
a line for recycling a particle stream (8) rich in oxygen-carrying material to reduction zone R0.

The plant can comprise a heat exchanger E3 in the dense fluidized phase formed in the bottom of dilute phase separation zone S2.

The plant can comprise a line for recycling a stream (10) comprising oxygen-carrying particles from the bottom of separation zone S2 to the lower part of reactive zone R1.

In one embodiment, the plant comprises a dedusting zone S4 provided with an intake line for receiving a transported phase (7) coming from separation zone S2, rich in ashes and fines, a discharge line allowing to discharge a gas stream (11) containing the major part of the ashes and the fines, and a transport line for carrying to reduction zone R0 a particle stream (12) comprising the major part of the oxygen-carrying material.

The plant can also comprise a dense phase elutriation separation zone S5 arranged downstream from dedusting zone S4, receiving through the inlet thereof a particle stream (12) comprising the major part of the oxygen-carrying material and comprising a line allowing delivery of a fluidization gas (13), a transport line for carrying a particle stream (14) rich in oxygen-carrying particles to reduction zone R0, and a line for discharging a gas stream rich in fly ashes (15).

The plant can comprise a line coming from dense phase separation zone S5 for recycling to reactive zone R1 a particle stream (17) comprising part of the solid particles separated in dense phase elutriation separation zone S5.

The plant can also comprise a heat exchanger E6 within the dense fluidized phase in separation zone S5.

LIST OF THE FIGURES

FIGS. 1 to 2 describe the invention by way of non limitative example.

Figure 1:
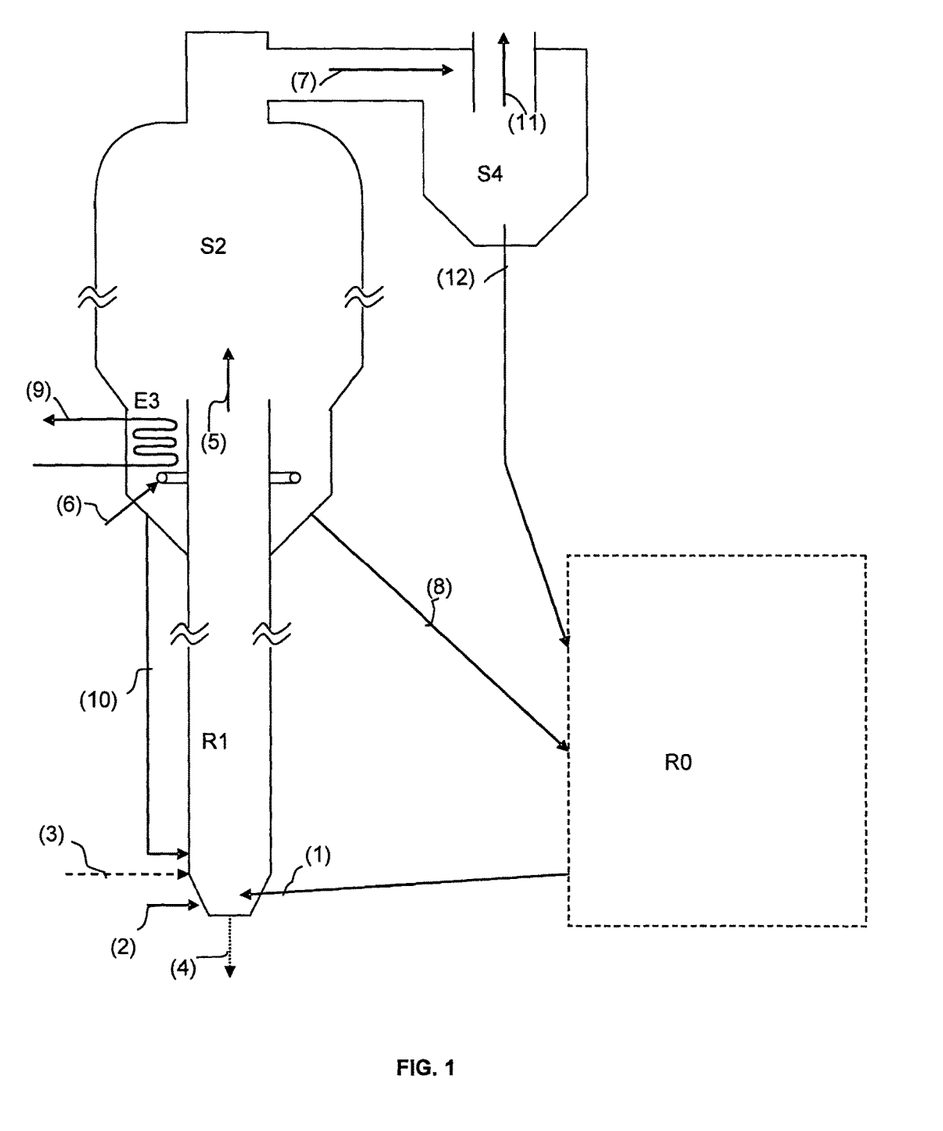
FIG. 1 shows the general principle of the chemical-looping combustion device with dilute phase removal of ashes in the oxidation zone according to the invention, in the optional case where the fumes coming from separation zone S2 are subjected to dedusting using a gas-solid separator S4.

The invention can be described in general terms from the scheme shown in FIG. 1.

DESCRIPTION OF FIG. 1

The device allowing the method according to the invention to be implemented comprises an oxidation zone that is notably made up of:
a reactive zone R1 (or reactive riser) where the oxidation reaction of the oxygen-carrying material coming from reduction zone R0 of the chemical combustion loop takes place,
a dilute phase separation zone (enclosure dedicated to dilute phase separation) for separation of the populations of oxygen-carrier fines, fly ashes and oxygen-carrier particles S2.

This device is optionally complemented by:
a heat exchanger E3 for heat extraction by a heat-carrying fluid (9) within the dense phase of separation zone S2,
a line for recycling the oxygen-carrying solid (10) from the dense phase of separation zone S2 to the base of reactive zone R1.

The oxygen-carrying material (MTO) is in the partly reduced state after reaction with a carbon source that it has contributed, in full or in part, to oxidizing within a combustion reactor or a reduction reactor also referred to as fuel reactor R0. After reaction in reduction zone R0, it is carried to the bottom of the oxidation zone, at the level of reactive zone R1, for example by pneumatic transport, in order to be oxidized on contact with air through enrichment of the crystal structure thereof in oxygen atoms. It is this reoxidation function on contact with air that enables the assembly made up of zones R1 and S2 and the optional variants, to be referred to as oxidation zone or air reactor. The oxygen-carrying material particles (1) are fed through a line into air reactor R1 in order to be reoxidized on contact with an air stream (2) advantageously provided in overstoichiometric proportion of the order of 0% to 20%, preferably 5% to 15%.

The reactor geometry is such that the velocity of the gas phase under the reaction conditions in reactive zone R1 preferably ranges between 3 and 30 m/s, more preferably between 5 and 15 m/s, and the transported oxygen-carrying solid stream generally ranges between 25 and 200 kg/s/m$^2$, preferably between 30 and 100 kg/s/m$^2$ so as to promote good contacting between the gases and the metallic oxide particles. This velocity is sufficient to ensure pneumatic transport of oxygen-carrying material particles belonging to group B of Geldart's classification. A reactor in such a configuration can then be referred to as a reactive "riser". The residence time of the solid particles advantageously ranges between 1 s and 1 min, preferably between 2 s and 20 s. During circulation of the solid in the chemical loop, it can form fines or it can be extracted with the ashes. In order to keep the oxygen-carrying material inventory constant in the unit, for example to make up for the loss of solid through attrition, it is possible to use make-up oxygen-carrying material particles (3) (optional) delivered through a make-up line. The major part of the agglomerated ashes, referred to as bottom ashes, as described above forms upon combustion of the solid hydrocarbon feedstock in the fuel reactor (reduction zone R0) where they are removed as they form. However, although these ashes are present in stream (1) in admixture with the oxygen-carrying material particles due to the particular configuration of the invention implementation, they can be eliminated by gravity flow in the bottom of reactive zone R1. The bed ashes are generally not transported pneumatically under the conditions of the method. They are found in the bottom of reactor R1 and they can form a solid flux (4) extracted through a line feeding extraction means that can be, for example, a cooled endless screw.

Mixed phase (5) comprising fluidization gas and solids is carried to dilute phase separation zone S2 where it enters, in form of a jet, an enclosure of significantly larger diameter than that of zone R1 so as to slow down the mixed phase. The gas flow rate is advantageously reduced to a velocity ranging between 0.1 and 2 m/s, preferably between 0.5 and 1.5 m/s. An elutriation phenomenon then occurs according to the grain size of the dilute phase particles where the oxygen-carrying material particles, denser and bigger than the ashes, are no longer transported and fall down on the bottom of the enclosure whereas the fly ashes continue to be carried along.

The mixed phase (5) feed means of separation zone S2 can comprise means for breaking the mixed phase jet at the outlet of reactive zone R1 and thus for slowing it down, a reactor internal for example.

In order to ensure maximum fluidization of the dense phase consisting of the accumulation of oxygen-carrying material particles in the enclosure bottom, it is possible to supply additional oxidizing gas (6) (additional air for example) so as to maintain a gas velocity value ranging between 30 and 300%, preferably between 50 and 150%, of the mean terminal settling velocity of the fine oxide particles of mean diameter generally ranging between 50 and 150 µm, which correspond to the fines produced by the fragmentation of the oxygen-carrying material through attrition. The possibility of varying the gas velocity ranges allows to adjust to the power variations of the unit and to decide to adjust the performances to the operating case selected. The minimum height of this fluidized dense phase is advantageously such that fluidization is homogeneous in the upper part of the fluidized bed, i.e. generally a height at least equal to half the diameter of the separation zone enclosure.

Two effluents result from this dilute phase elutriation separation:
an ash-rich transported phase (7) comprising at least 50%, preferably 90% of the ashes coming from mixed phase (5), and less than 5%, preferably less than 20% of oxygen-carrying material containing essentially fines whose mean diameter is below 150 µm,
a solid flow (8) rich in oxygen-carrying material comprising less than 5% ashes and preferably less than 1% ashes that supplies reduction zone R0 with oxidized oxygen carrier.

Optionally, a heat exchanger E3 can be arranged within the dense fluidized phase formed in the bottom of separation zone S2 through the accumulation of oxygen-carrying material particles. A heat-carrying fluid (9) circulates in exchanger E3, either as a purely single-phase (gas or liquid) flow or, if vapour is to be generated and the heat exchange is to be maximized, in entirely or partly vaporized form.

Optionally, a line for recycling a solid flux (10) can be arranged between the dense fluidized phase in the bottom of separation zone S2 and the bottom of reactive riser R1. This line allows to recycle part of the oxygen-carrier particles settled at the bottom of the dilute phase separation zone to the bottom of the oxidation zone, at the level of reactive zone R1. This allows to achieve loop circulation of the oxygen-carrying material particles in the oxidation zone, and thereby to increase the mean residence time of the particles on contact with air. This variant thus makes it possible to control the degree of oxidation of the solid and thus to meet the oxygen carrying requirements for chemical-looping combustion.

Optionally, the transported-phase ash-rich stream (7) can be carried to a cyclone type gas-solid separation device S4 that advantageously complements the separation of the ashes and of the oxygen-carrying material: ashes, fine particles are carried along (11) with the gas, while solid stream (12) comprising the oxygen-carrying material is sent back through a line to reduction zone R0, like solid stream (8) coming from the oxidation zone. Solid stream (8) coming from the dense phase of dilute phase separation zone S2 can be combined with solid stream (12) coming from separator S4 so as to be optionally gathered in a single feed line of R0.

Figure 2:
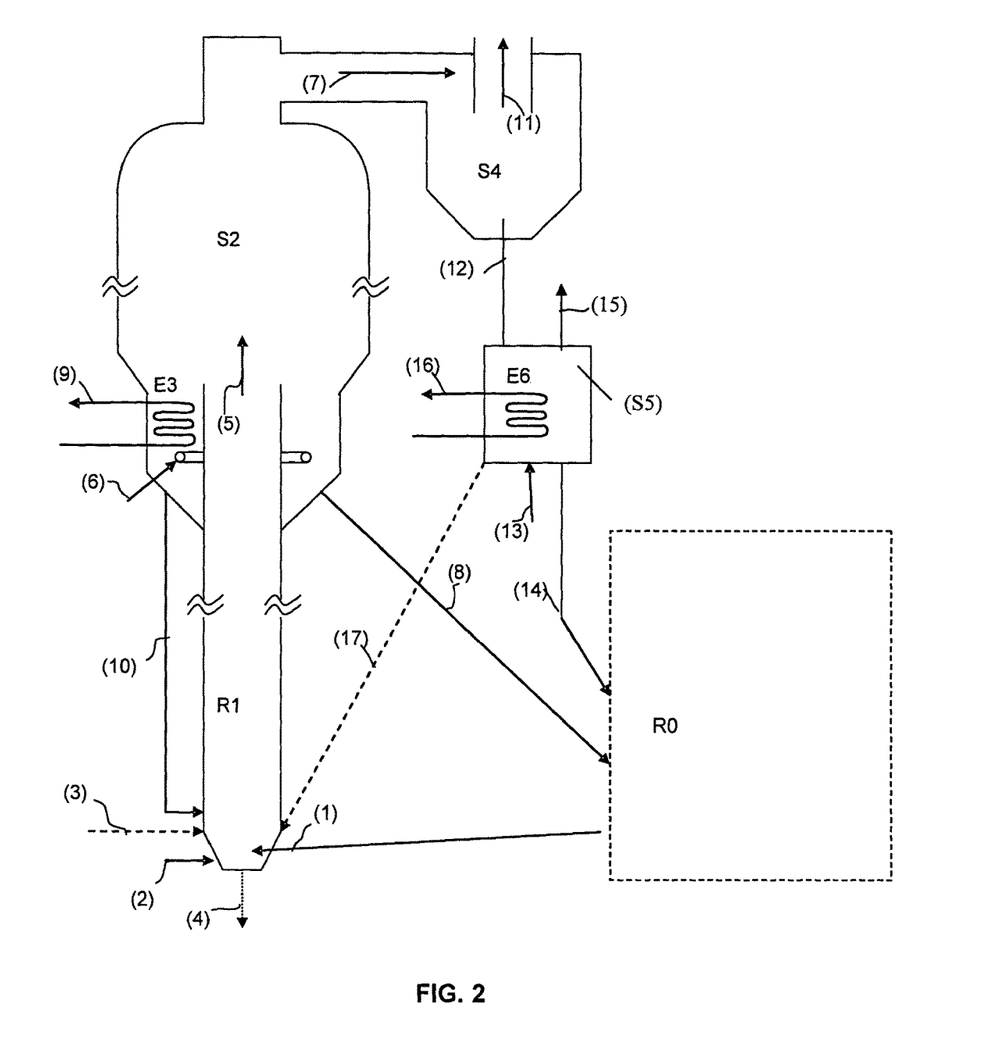
FIG. 2 shows an embodiment of the chemical-looping combustion device with ash removal, wherein separation of the ashes in the oxidation zone is complemented by dense phase separation outside the oxidation zone.

DESCRIPTION OF FIG. 2

The description of FIG. 2 is identical to that of FIG. 1 except that, in addition to separation zone S2 superimposed on reactive zone R1, the plant comprises a separation zone S5 arranged downstream from cyclone S4. The transported phase comprising gas and solids (7) flows out of a line of the oxidation zone comprising the reactive riser and the dilute phase separation zone (R1+S2), and it is separated in a dedusting zone in form of a gas-solid separator S4, a cyclone for example, whose cut-off diameter typically ranges between 10 and 20 µm, in order to form two effluents: a gaseous effluent (11) carrying along the solid fines (oxygen-carrying material fines and ashes), and a solid effluent (12) (oxygen-carrier particles and ashes). Advantageously, fumes (11) undergo an additional treatment prior to being discharged to the atmosphere, at the minimum dedusting so as to recover the ashes outside the reaction zone and cooling through thermal exchange allowing heat recovery, and optionally removal of the sulfur oxides and of the nitrogen oxides.

Solid effluent (12) is sent to the fluidized bed reactor of dense phase elutriation separation zone S5. The reactor is fluidized by a fluidization gas (13) selected from among the gases that are not likely to decrease the degree of oxidation of the oxygen-carrying material, preferably vapour, nitrogen or even air, the latter being likely to contribute to increasing the degree of oxidation of the solid. Potentially reducing gases such as light hydrocarbons, carbon monoxide or hydrogen are preferably avoided.

The main purpose of dense phase elutriation separation zone S5 according to the present invention is to separate the fly ashes from the oxygen-carrying particles. Separation is achieved by elutriation in a dense phase fluidized bed: the velocity of the gas phase in dense phase separation zone S5 is adjusted in such a way that the oxygen-carrying material particles, bigger and denser than the ashes, remain in the fluidized bed, and the fly ashes, less dense and smaller than the oxygen-carrying material particles, are carried along with the gas phase through pneumatic transport.

In general terms, the gas velocity ranges between 0.3 and 1.5 m/s, preferably between 0.4 and 1 m/s, so as to reach entrained particle flux values ranging between 0.01 and 5 kg/s/m$^2$, preferably between 0.05 and 0.5 kg/s/m$^2$. Two effluents are obtained, a solid flow (14) rich in oxygen-carrying material particles comprising less than 5% ashes, preferably less than 1 wt. % ashes, which is recycled to reduction zone R0, and a gaseous effluent rich in fly ashes (15) comprising less than 30 wt. % oxygen-carrying material particles, preferably less than 15% oxygen-carrying material particles.

Optionally, a heat exchanger E6 can be arranged within the dense fluidized phase formed in the bottom of separation zone S5 through the accumulation of oxygen-carrying material particles. A heat-carrying fluid (16) circulates in exchanger E6, either as a purely single-phase (gas or liquid) flow or, if vapour is to be generated and the heat exchange is to be maximized, in entirely or partly vaporized form.

Optionally, a solid stream (17) can be sent from dense phase elutriation separation zone S5 to reactive oxidation zone R1, this recycling having the effect of:
circulating the oxygen-carrying material in a loop in the oxidation zone so as to maximize the degree of oxidation thereof, similar to the recycle loop using the line carrying solid stream (10) coming from dilute phase separation zone S2, and of
circulating again the ashes that have remained mixed with the oxygen-carrying material through separation zones S2 and S5.

EXAMPLE

The example relates to FIG. 1.

We consider here a chemical loop wherein an oxygen-carrying metallic oxide circulates with a gross thermal power of the order of 300 MWth, i.e. a solid circulation equivalent to 1077 kg/s.

We consider the combustion of a gas containing 14% ashes feeding the unit at a rate of 11.6 kg/s. The coal is supplied in the fuel reactor with a grain size characterized by the fact that less than 2% of the coal has a particle size above 200 microns.

The oxygen carrier used is a solid of ilmenite type with a density of 5000 kg/m$^3$.

The present example relates to the removal of ashes in the air reactor (oxidation zone) according to the present invention in such a way that the ashes removed are equivalent, in mass flow rate, to the flow of ashes entering the unit (corresponding to the ashes of the feedstock supply on a continuous basis), i.e. a flow of ashes to be removed of 1.62 kg/s. By hypothesis, the ashes are only removed at the level of zone S2 as described in FIG. 1 and in a cyclone S4 associated therewith at the outlet of zone S2.

The grain size populations of the ashes and of the oxygen-carrying material are given in Table 2 hereafter:

TABLE 2

Grain size of the various particles circulating in the plant

| dpmin µm | dpmax µm | Oxide wt. % | Ashes wt. % |
|---|---|---|---|
| 0 | 5 | 0.00 | 10.80 |
| 5 | 10 | 0.00 | 15.74 |
| 10 | 15 | 0.00 | 12.16 |
| 15 | 20 | 0.00 | 9.78 |
| 20 | 25 | 0.00 | 8.01 |
| 25 | 30 | 0.00 | 6.63 |
| 30 | 35 | 0.00 | 5.53 |
| 35 | 40 | 0.00 | 4.64 |
| 40 | 45 | 0.00 | 3.91 |
| 45 | 50 | 0.00 | 3.30 |
| 50 | 60 | 0.00 | 4.03 |
| 60 | 70 | 0.02 | 4.06 |
| 70 | 80 | 0.13 | 2.96 |
| 80 | 90 | 0.50 | 2.17 |
| 90 | 100 | 1.35 | 1.60 |
| 100 | 125 | 6.07 | 1.86 |
| 125 | 150 | 18.53 | 1.44 |
| 150 | 175 | 24.22 | 0.70 |
| 175 | 200 | 20.87 | 0.35 |
| 200 | 250 | 18.25 | 0.22 |
| 250 | 300 | 8.06 | 0.09 |
| 300 | 350 | 1.65 | 0.02 |
| 350 | 400 | 0.29 | 0.01 |
| 400 | 450 | 0.05 | 0.00 |
| 450 | 500 | 0.01 | 0.00 |
| 500 | 750 | 0.00 | 0.00 |
| 750 | 1000 | 0.00 | 0.00 |

The particle properties and the terminal settling velocities (Ut in m/s) as a function of the mean particle diameter (dp in µm) for the ashes and the oxygen-carrying material are given in Table 3 hereafter.

TABLE 3

Particle properties and terminal settling velocities (Ut in m/s) as a function of the mean particle diameter (dp in µm) for the ashes and the oxygen-carrying material.

|  | Ashes | Oxygen-carrying material |
|---|---|---|
| ρg | 0.36 | 0.36 |
| ρp | 2500 | 5000 |
| µg | 0.000048 | 0.000048 |
| dp µm | Ut | Ut |
| 10 | 3.00E-03 |  |
| 25 | 1.70E-03 |  |
| 50 | 6.90E-03 | 0.138 |
| 75 | 0.155 | 0.31 |
| 100 | 0.276 | 0.54 |
| 150 | 0.589 | 1.08 |
| 200 | 0.94 | 1.67 |

With ρg the gas density in kg/m$^3$, ρp the solids density in kg/m$^3$ and µg the gas viscosity in Pa·s.

For a gas velocity of 0.75 m/s in zone S2, a separation efficiency of the order of 50% on the ashes and 20% on the oxygen-carrying material is obtained (each population concerned representing mean particle diameters <150 µm).

This results in a mass entrainment of 5.3% of the mass flow of oxygen-carrying material from stream (5) and of 49.3 mass % of the ashes from stream (5). These entrained particles make up stream (7).

Stream (7) then passes into cyclone S4 with a solid recovery efficiency of 91% for the ashes and of 99.8% for the oxygen-carrying material.

This cyclone efficiency combined with separator S2 results in the continuous removal through line (11) of a fraction equal to 4.44 mass % of the ashes from (5) and of 0.011 mass % of the oxygen-carrying material.

This capacity for eliminating the ashes allows to limit the proportion of ashes present in the bed. Thus, at the power selected, the device has to remove 1.67 kg/s ashes, which corresponds to a mass flow rate of ashes in stream (5) of 38.0 kg/s, i.e. 3.4 mass % of the total flow of oxygen-carrying material and ashes (5). For the oxygen-carrying material stream, this leads to a fines removal in a proportion of 0.114 kg/s oxygen-carrying material for stream (11), which adds up to the 1.67 kg/s ashes.

In conclusion, an ash-rich stream (11) is obtained in a proportion of 93.6% and the proportion of ashes in the circulating bed is kept at 3.4%, even by limiting the removal of ashes in zone S2 to 50% (i.e. with a 50% ash removal efficiency).

The invention claimed is:

1. A method for chemical-looping combustion of a hydrocarbon feedstock of solid particles, wherein an oxygen-carrying material circulates in form of oxygen-carrying material particles, comprising:
   contacting hydrocarbon feedstock particles with the oxygen-carrying material particles in a reduction zone R0,
   contacting oxygen-carrying material particles from reduction zone R0 with an oxidizing gas stream in a reactive oxidation zone R1,
   separating fly ashes, oxygen-carrying material fines and the oxygen-carrying material particles within a mixture from zone R1 by dilute phase elutriation in a dilute phase separation zone S2 so as to discharge through a discharge line a gaseous effluent comprising the major part of the fly ashes and of the oxygen-carrying material fines, and to send a particle stream comprising the major part of the oxygen-carrying material particles to reduction zone R0, the driving force required for dilute phase elutriation in the dilute phase separation zone S2 being provided by the oxidizing gas stream coming from the reactive oxidation zone R1.

2. A method as claimed in claim 1, wherein the oxygen-carrying material particles are circulated in a loop in the reactive oxidation zone R1 by means of a line allowing to recycle a stream of oxygen-carrying particles sedimented in the dense fluidized phase, from the bottom of the dilute phase separation zone S2 to the lower part of the reactive oxidation zone R1.

3. A method as claimed in claim 1, wherein heat is recovered in the dense fluidized phase formed in the bottom of the dilute phase separation zone S2 by means of a heat exchanger E3.

4. A method as claimed in claim 1, wherein an additional oxidizing gas stream is fed to the top of the reactive oxidation zone R1 so as to maintain a gas velocity ranging between 30 and 300% of the mean terminal settling velocity of the oxygen-carrying material fines of diameter ranging between 50 and 150 μm.

5. A method as claimed in claim 1, comprising:
   carrying out deep separation of the ashes, the oxygen-carrying material fines and the oxygen-carrying particles in a dedusting zone S4 in order to discharge a gas stream containing the major part of the ashes and the oxygen-carrying material fines, and a particle stream containing the major part of the oxygen-carrying material particles that is sent through a delivery line to the reduction zone R0.

6. A method as claimed in claim 5, comprising:
   carrying out dense phase elutriation separation in a dense phase elutriation separation zone S5 arranged downstream from the dedusting zone S4 and fluidized by a non-reducing gas allowing to separate the fly ashes from the oxygen-carrying material particles in the particle stream containing the major part of the oxygen-carrying material particles from the dedusting zone S4 in order to send a particle stream rich in oxygen-carrying material particles to reduction zone R0 and to discharge a gas stream rich in fly ashes.

7. A method as claimed in claim 6, wherein a particle stream comprising part of the oxygen-carrying material particles separated in dense phase elutriation separation zone S5 is recycled to the oxidation zone R1.

8. A method as claimed in claim 6, wherein heat is recovered in the dense fluidized phase of separation zone S5 by means of a heat exchanger E6.

9. A plant for carrying out chemical-looping redox combustion of a solid hydrocarbon feedstock according to the method as claimed in claim 1, said plant comprising at least:
   a reduction zone R0,
   an oxidation zone comprising a reactive zone R1 provided with feed means supplying oxygen-carrying material particles coming from reduction zone R0 and feed means supplying oxidizing fluidization gas, and a dilute phase elutriation separation zone S2 arranged above reactive zone R1, of significantly larger diameter than the reactive zone R1 so as to slow down the mixed phase coming from the reactive zone R1 and provided with feed means allowing to feed a mixed phase comprising gas and particles coming from the reactive zone R1,
   a discharge line for discharging a transported phase rich in ashes and fines,
   a line for recycling a particle stream rich in oxygen-carrying material particles to the reduction zone R0.

10. A plant as claimed in claim 9, comprising a heat exchanger E3 in the dense fluidized phase formed in the bottom of the dilute phase elutriation separation zone S2.

11. A plant as claimed in claim 9, comprising a line for recycling a stream comprising oxygen-carrying particles from the bottom of the dilute phase elutriation separation zone S2 to the lower part of the reactive zone R1.

12. A plant as claimed claim 9, comprising a dedusting zone S4 provided with an intake line for receiving a transported phase coming from the dilute phase elutriation separation zone S2, rich in ashes and fines, a discharge line allowing to discharge a gas stream containing the major part of the ashes and the fines, and a transport line for carrying to the reduction zone R0 a particle stream comprising the major part of the oxygen-carrying material particles.

13. A plant as claimed in claim 12, comprising a dense phase elutriation separation zone S5 arranged downstream from the dedusting zone S4, receiving through the inlet thereof a particle stream comprising the major part of the oxygen-carrying material particles and comprising a line allowing delivery of a fluidization gas, a transport line for carrying a particle stream rich in oxygen-carrying material particles to the reduction zone R0, and a line for discharging a gas stream rich in fly ashes.

14. A plant as claimed in claim 13, comprising a line coming from the dense phase elutriation separation zone S5 for recycling to the reactive zone R1 a particle stream comprising part of the solid particles separated in the dense phase elutriation separation zone S5.

15. A plant as claimed in claim 13, comprising a heat exchanger E6 within the dense fluidized phase in the dense phase elutriation separation zone S5.

* * * * *